United States Patent
Prats

[11] 3,771,360
[45] Nov. 13, 1973

[54] VERTICAL PERMEABILITY TEST
[75] Inventor: Michael Prats, Houston, Tex.
[73] Assignee: Shell Oil Company, Houston, Tex.
[22] Filed: Sept. 27, 1971
[21] Appl. No.: 183,909

[52] U.S. Cl. ................................................. 73/155
[51] Int. Cl. ............................................ E21b 49/00
[58] Field of Search ....................... 73/155; 166/250

[56] References Cited
UNITED STATES PATENTS
3,321,965   5/1967   Johnson et al. ........................ 73/155
3,550,445   12/1970  Kiel ...................................... 73/155

Primary Examiner—Jerry W. Myracle
Attorney—Harold L. Denkler et al.

[57] ABSTRACT

Permeabilities normal to and parallel to the plane of a subterranean hydrocarbon reservoir are measured by flowing a liquid through a single short interval of a well at a substantially constant rate and recording the variation of well pressure with time. In one embodiment normal permeability is determined by comparing the record pressure with a reference pressure response. In a second embodiment, fluid flow is stopped after a selected period of time, the variation of well pressure with time after fluid is stopped is measured, and normal permeability is determined from this measured variation of pressure with time.

5 Claims, 2 Drawing Figures

VERTICAL PERMEABILITY TEST

BACKGROUND OF THE INVENTION

1. Field of the Invention

This invention relates to well testing; and more particularly, to a method for measuring the average vertical (or normal) permeability of subterranean earth formation.

2. Description of the Prior Art

Knowledge about the vertical permeability of substantially horizontal oil and gas producing subterranean formation (or permeability normal to the plane of a dipping formation) is sometimes necessary to properly anticipate the production performance of a hydrocarbon reservoir. The spacing of wells, the rate of production, stimulation procedures, and pressure maintenance programs for both primary and secondary recovery are often based to a large extent upon a determination or estimation of this reservoir parameter.

Copending applications Ser. No. 795,408, filed Jan. 31, 1969, U.S. Pat. No. 3,604,256 and Ser. No. 162,890, filed July 15, 1971, teach that the normal permeability of a formation may be determined in situ by injecting a fluid into the formation at one point and measuring the pressure response at a vertically displaced point. This may be done either in a single well or in two wells. In order to make the required measurements in a single well using these methods it is necessary to use two perforated intervals separated by a packer.

SUMMARY OF THE INVENTION

A method has now been discovered for determining the average permeability normal to the plane of a subterranean earth formation in a single well using a single perforated interval. The method comprises the steps of extending a well into a subterranean earth formation, casing the well with tubular casing, perforating the casing through a single short interval adjacent the subterranean earth formation, and determining the relative position of the perforated interval within the formation. A fluid is then flowed through the formation at a substantially constant rate, and pressure response (i.e., the variation with time of the well pressure) is measured. In one embodiment this measured pressure response is compared with a reference pressure response to determine the permeability normal to the plane of the formation. In a second embodiment fluid flow is stopped after a selected period of time, the variation of well pressure with time after fluid flow is stopped is measured, and normal permeability is determined from the measured variation of pressure with time.

DESCRIPTION OF A PREFERRED EMBODIMENT

Figure 1:
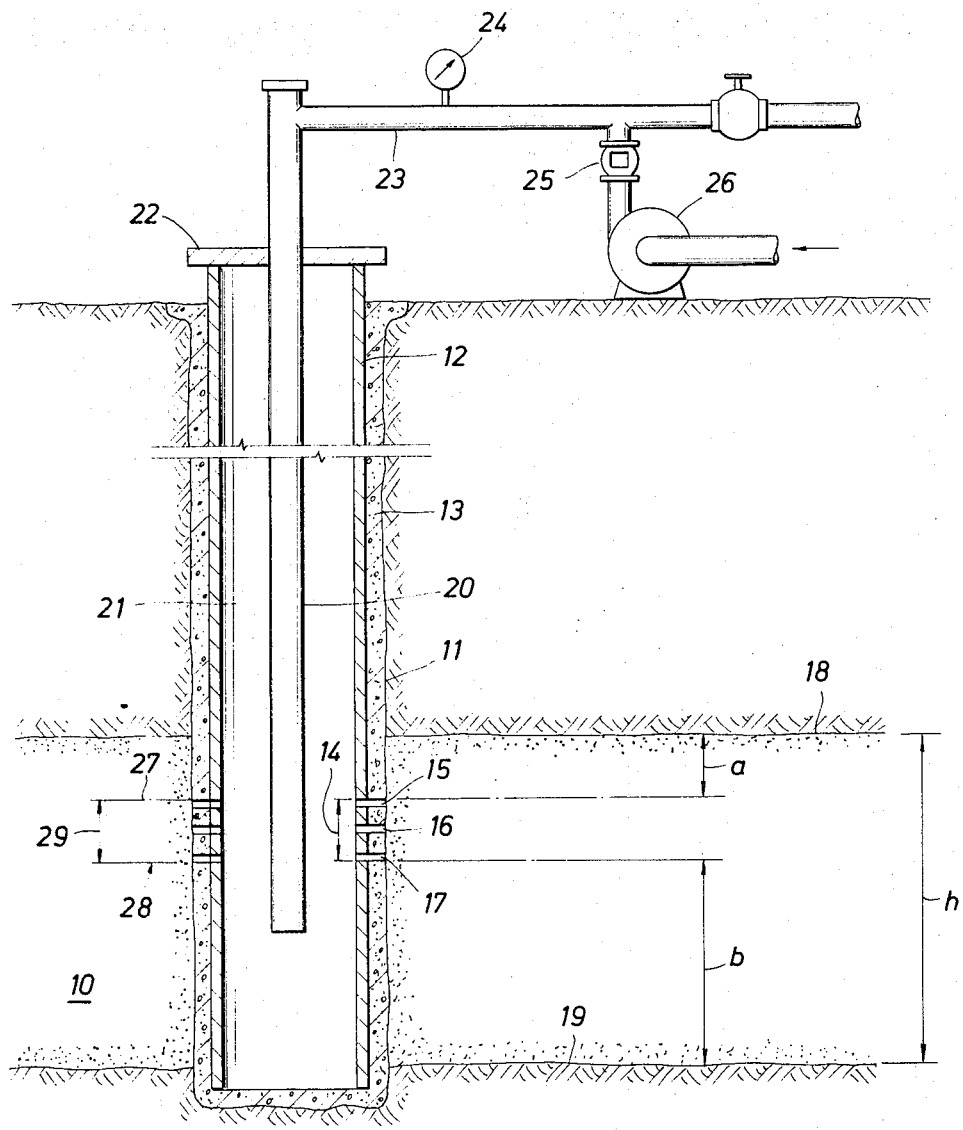
FIG. 1 is a cross sectional view showing an earth formation traversed by a well suitably equipped for the practice of this invention.

Referring to FIG. 1, we see an earth formation 10 of thickness $h$. To determine the permeability of the formation 10 normal to the plane of the formation according to the method of this invention, the formation is first traversed by a well bore hole 11. The bore hole 11 is preferably cased with a casing 12 which may be cemented therein with cement 13 according to conventional procedures. A portion of the bore hole 11 adjacent the formation 10 is then opened into fluid communication with the formation 10 as by perforating the casing 12 with a number of perforations 15–17 through an interval 14. The length of the perforated interval 14 should be less than the thickness, $h$, of the formation 10 as determined in a conventional manner, for example from well logs. Preferably, the length of the interval 14 is less than one half of thickness $h$. The distance, $a$, between the uppermost perforation 15 and the top 18 of the formation 10 as well as the distance, $b$, between the lowermost perforation 17 and the bottom 19 of the formation 10 are determined, for example by comparing the depth of the perforating tool at the time the perforations are made with the depth of the top 18 and bottom 19 of the formation 10 as determined from wel logs.

After the casing 12 is perforated, the well may be equipped with a string of tubing 20 which provides a fluid conduit from the surface to near a point in the bore hole 11 adjacent the formation 10. The annular space 21 between the casing 12 and the tubing 20 is closed to fluid flow above the perforated interval by a pack-off means such as well head assembly means 22. One may also choose to omit tubing and use casing 12 as the fluid conduit.

The top of the tubing string 20 is preferably connected in fluid communication with a flow line 23 which may carry a sensitive pressure measuring and recording means 24 of a conventional type and a flow metering means 25. Alternatively, a pressure measuring means, such as a gauge, may be lowered into the bore hole 11. For example such a gauge may be attached to the tubing 20 at a point adjacent the formation 10.

The flow line 23 is operatively connected to a pump means 26 adapted to pump a fluid from a fluid source (not shown) through flow line 23 and tubing 20 into formation 10. The pump means 26 is preferably of a type adapted to maintain a substantially surge-free fluid pressure. For example, the pump means 26 may be a centrifugal pump as shown in the drawing or may be a piston pump provided with pressure filter means such as surge tanks.

To determine the normal permeability a fluid, such as produced fluid from the formation 10, is pumped via pump means 26 through the tubing 20 and into the formation 10 at a selected injection rate which is preferably maintained substantially constant. Simultaneously, the variation with time of injection pressure is measured with pressure measuring means 24. This measured pressure response is compared with a reference pressure response to determine the normal permeability of the formation 10 as hereinafter described. Advantageously, the injection of fluid into the formation 10 is continued at least until injection pressure varies with the logarithm of time.

It is, of course, expected that the measured injection pressure will increase with time as the fluid injection rate is maintained constant. If the formation 10 has no normal permeability, the injection pressure response may be expected to be that observed in an identical reservoir which is just as thick as the perforated interval 14 is long. If the formation 10 has a finite and non-zero normal permeability, the pressure increase may be expected to be less than that which would be observed in a reservoir having a thickness equal to the length of the perforated interval 14 because it may be expected that some injected fluid will flow vertically into portions of the formation which do not intersect the perforated interval 14 at the bore hole 11. Correspondingly, if the formation 10 has an infinite normal permeability, the injection pressure response as fluid is injected into the formation at a constant rate through the perforated inverval 14 may be expected to be substantially equal to the pressure response observed if the entire interval of the bore hole 11 adjacent the formation 10 were perforated, because there would be no resistance to flow from portions of the formation 10 in fluid communication with the bore 11 by flow parallel to the plane of the formation 10 (i.e., portions of the formation 10 with zone 29 between the dashed lines 27 and 28 of FIG. 1) to portions of the formation not in parallel communication with the bore hole 11.

For formations of finite normal permeability, the injection pressure required to maintain a constant injection rate through a perforated interval, such as interval 14, at the end of a given period of injection is greater than that which is required if the entire interval of the bore hole adjacent the formation 10 is perforated because fluid will encounter resistance as it flows vertically into portions of the formation outside the zone 29 which are not in parallel communication with the perforated interval 14 of the bore hole 11. Therefore, normal permeability of formation 10 may be determined by comparing the pressure response observed as fluid is injected through the perforated interval 14 with a reference pressure response substantially equal to that observed for the same injection flow rate if the entire interval of the bore hole 11 adjacent the formation 10 is perforated.

For example, the expected long-time pressure rise, $\Delta p(t)$, at an injection well resulting from a constant rate of injection, $q$, through a perforated interval 14 which extends from distance, $a$, from the top 18 to distance, $b$, from the bottom 19 of a formation 10 of thickness $h$ may be given mathematically by an equation of the form:

$$\Delta p(t) = 70.6q/T_p \left[\ln t + \ln (T_p/Sr_w^2) - 3.23 + 2sh/b-a\right] + (70.6q/T_p) G (a/h, b/h, (r_w^2/h^2) k_n/k_p) \quad 1$$

where, $s$ = skin factor determined assuming entire interval $h$ is open to fluid flow;
$T_p$ = the parallel transmissibility of the formation which may be determined in a conventional manner, as from the slope of a plot of $\Delta p(t)$ versus the base 10 logarithm of time, $t$ (see injection curve of FIG. 2);
$S$ = the storage capacity of the reservoir, known;
$r_w$ = well radius
$k_n$ = permeability normal to the plane of the formation;
$k_p$ = permeability parallel to the plane of the formation;
$t$ = time;
$G$ = a pseudo-geometrical function which depends on the position of the perforated interval from the top and bottom of the sand, $a/h$ and $b/h$, on the ratio of the well radius to the formation thickness, $r_w^2/h^2$, and on the anisotropy ratio, $k_n/k_p$.

Equation (1) is a mathematical statement of the fact that the pressure rise resulting from a constant rate of injection through a perforated interval of a formation hving a finite permeability in a direction normal to the plane of the formation may be given by a summation of the pressure rise to be expected in a formation having the same parallel transmissibility, $T_p$, as the subject formation but having an infinite permeability normal to the plane of the formation (i.e., the first bracket quantity above) plus a correction factor which accounts for the relative position of the perforated interval in the formation, for the size of the wellbore, and for the finite normal permeability of the formation (i.e., the $G$ function above).

In other words the G function of Equation (1) is a measure of the magnitude of the difference between the observed pressure response, $\Delta p(t)$, and the response, $\Delta p(t)_R$, expected if there were no resistance to flow normal to the plane of the formation. Thus, if the $G$ function, which depends solely on the known position of the perforated interval with respect to the top and bottom of the formation, on the known ratio of the well radius to the formation thickness, and on the anisotropy ratio, is defined as a fucntion of perforated interval position with respect to the top and bottom of a formation, $a/h$ and $b/h$, and well radius to formation thickness ratio, $r_w/h$, which are known quantities, then the anisotropy ratio, $k_n/k_p$, may be determined from a composition of the observed pressure response $\Delta p(t)$ with a preselected reference pressure response, $\Delta p(t)_R$. Once the ratio $k_n/k_p$ is known, $k_n$ may be easily determined where parallel transmissibility, $T_p$, formation thickness, $h$, an injected fluid viscosity, $\mu$, are known since $k_p$ may be determined from the equation $$T_p = k_p h/\mu \quad 2$$

The reference pressure response, $\Delta p(t)_R$ may be determined by measurement. The measurement is preferably made after $\Delta p(t)$, the pressure response for injection of a fluid at a constant rate through the perforated interval 14, has been measured. For example, the tubing 20 may be removed (when it interferes with the perforating) from the bore hole 11 after measuring $\Delta p(t)$ and the casing 12 and cement 13 adjacent the formation 10 may be provided with a number of additional perforations (not shown) by conventional procedures so that substantially the entire interval of the bore hole 11 adjacent the formation 10 is open into fluid communication with the formation 10. The tubing 20 may then be reinstalled and the well equipped as heretofore described. The reference pressure response, $\Delta p(t)_R$, and skin, $s$, may then be determined by injecting a fluid, such as produced reservoir fluid from the formation 10, into the formation 10 at a selected substantially constant rate while measuring the variation with time of injection pressure.

The G function may be determined empiricially as by making measurements of pressure response, $\Delta p(t)$, for a number of cases of varying injection interval position, $a/h$ and $b/h$, and well bore radius to formation thickness ratio, $r_w/h$, in formations where the anisotropy ratio, $k_n/k_p$, and reference pressure response, $\Delta p(t)_R$, are known. The G function may also be determined by numerically solving the well known diffusivity equation for fluid flow in a porous medium for appropriate injection interval geometry and boundary conditions on a properly programmed digital computer (e.g., see Kazemi and Seth, "Effect of Anisotropy and Stratification on Pressure Transient Analysis of Wells with Restricted Flow Entry," *Journal of Petroleum Technology*, May 1969, page 639) or may be determined by evaluating the following equation adapted from Kazemi and Seth for a large number of values of $a/h$, $b/h$, $r_w/h$, and $k_n/k_p$:

$$G = \frac{4}{\pi B} \sum_{n=1}^{\infty} R_n K_0\left(\frac{n\pi}{\bar{h}}\right) \quad (3)$$

where $$R_n = 1/n \,[\, \sin(n\pi[h-a]/h) - \sin(n\pi b/h)\,] \cos(n\pi Z/\bar{h}), \quad (20)$$

$$Z = \sqrt{k_p/k_n}/2 \,(h-a+b/r_w)$$

$$B = h - a - b/h$$

$$\bar{h} = \sqrt{k_p/k_n}\,(h/r_w)$$

and $K_o$ is a well known Bessel function.

For convenience, the G function may be made available in tabular or graphical form to give anisotropy ratio, $k_n/k_p$, as a function of the difference between the measured pressure response, $\Delta p(t)$, and reference pressure response, $\Delta p(t)_R$, for a given well bore radius to formation thickness ratio, $r_w/h$, and for a given perforated interval placement, $a/h$ and $b/h$. The normal permeability of a formation may be determined by entering these graphs or tables with the value of the G function for the formation and test interval in question determined by comparing the measured pressure response, $\Delta p(t)$, with the reference pressure response, $\Delta p(t)_R$, measured with the entire interval of the bore hole 11 open into fluid communication with the formation 10, and after taking into account the value of the skin, $s$, measured with the entire interval open.

The normal permeability of the formation in question may, alternatively, be determined without measuring the reference pressure response $\Delta p(t)_R$ by continuing injection of fluid into the formation 10 until a selected time, $\Delta t$, at which measured injection pressure varies linearly with the logarithm of time, stopping fluid injection at this time, and continuing to measure pressure response, $\Delta p(t)$, (which will now begin to decrease) at least until the measured pressure response varies linearly with the logarithm of the quantity $t/(t-\Delta t)$.

After stopping fluid injection at time $\Delta t$, the pressure response is of the form $$\Delta p(t) = \frac{70.6q}{T_p}\left[\ln\frac{t}{t-\Delta t} + G\left(\frac{a}{h},\frac{b}{h},\frac{r_w^2 k_n}{h^2 k_p}\right) - F\left(\frac{a}{h},\frac{b}{h},\frac{r_w^2 k_n}{h^2 k_p},\frac{T_p(t-\Delta t)}{948 S r_w^2}\right)\right] \quad (4)$$

where time, $t$, is measured from the initiation of injection, where the G function is as discussed above and where the F function is time dependent and determinable, for example, from Kazemi and Seth's sum:

$$\frac{2}{\pi B}\sum_{n=1}^{\infty} R_n W\left(\frac{1}{4t_D},\frac{n\pi}{\bar{h}}\right), \quad (5)$$

where $$W(u,v) = \int_{\mu}^{\infty} e^{(-\lambda + v^2/4\lambda)}\frac{d\lambda}{\lambda},$$

and $t_D = k_p t/\phi\mu c r_w^2$.

The G and F functions are identical for large times; therefore, $$p(t)|_{t\,\text{large}} = \frac{70.6q}{T_p}\ln\left(\frac{t}{t-\Delta t}\right). \quad (6)$$

Figure 2:
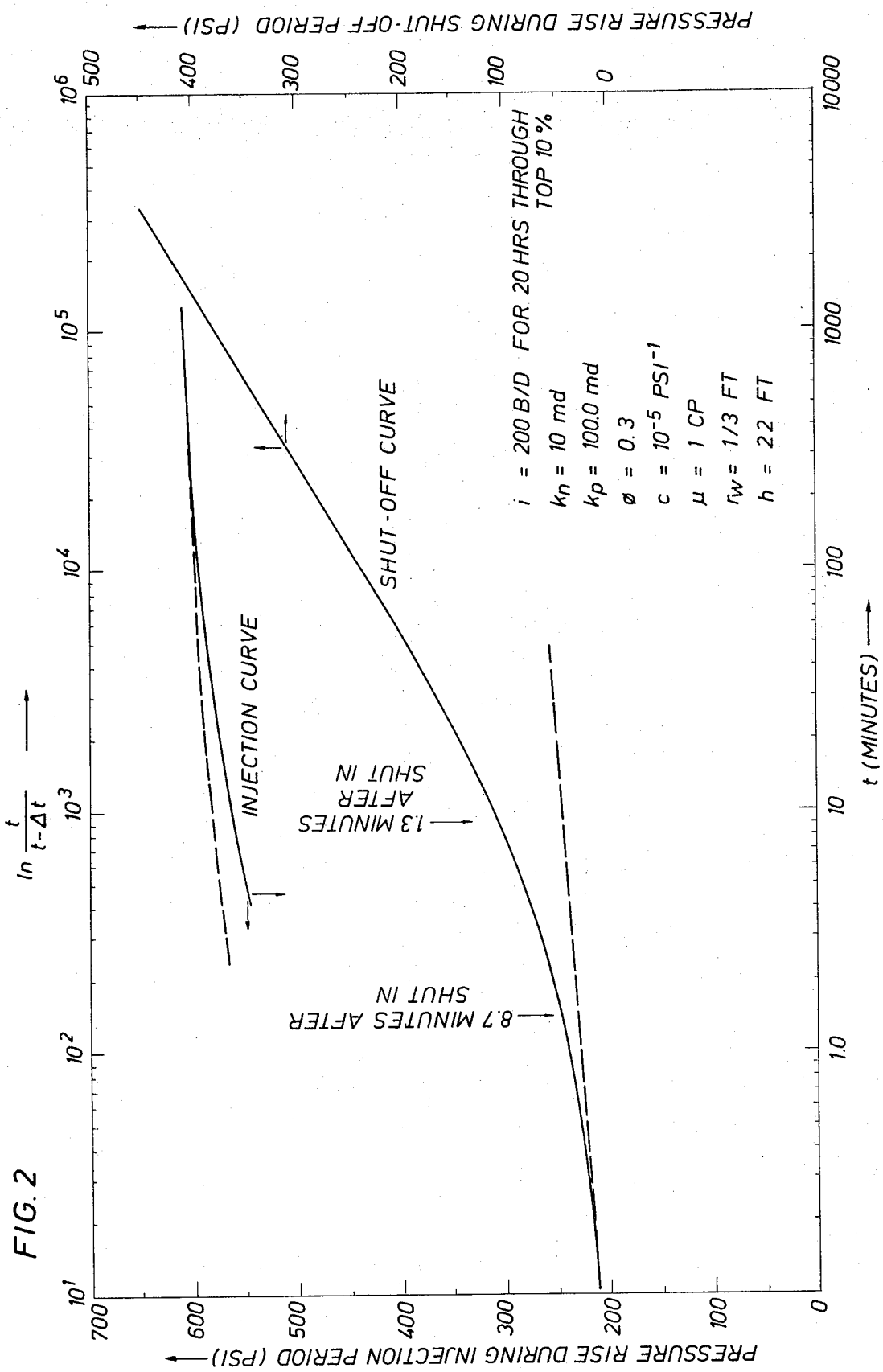
FIG. 2 is a graph showing measured pressure response as a function of the logarithm of time and showing pressure response after shut in as a function of the logarithm of $t/(t-\Delta t)$ for an example injection — shut-in test, as described below, in a reservoir having the properties given on the figure.

The pressure response during shut-off is schematically illustrated in FIG. 2 as a function of log $t/(t-\Delta t)$ for a fluid-containing formation having the formation properties and dimensions given on the figure, after a 20 hour period of fluid injection into the top 10 percent of the formation at a rate of 200 bbls per day. At large times, the pressure response, $\Delta p(t)$, becomes linear with long $t/t-\Delta t$, as indicated by the straight line portion of the curve and equation (6). For relatively short times the pressure response is higher than that given by linear extrapolation of the large time response, the latter being indicated by the lower dashed line. The difference, $\Delta P(t)$, between this dashed line and the measured pressure is equal to $$\frac{70.6q}{T_p}\left[G\left(\frac{a}{h},\frac{b}{h},\frac{r_w^2 k_n}{h^2 k_p}\right) - F\left(\frac{a}{h},\frac{b}{h},\frac{T_p(t-\Delta t)}{948 S r_w^2}\right)\right] \quad (7)$$

The value of $70.6q/T_p$ is the slope of the dashed straight line portion of FIG. 2, and the functions G and F are known functions of the parameters $a/h$, $b/h$, $r_w^2 k_p$, $T(t-\Delta t)/948\, S\, r_w^2$ determinable from equations (3) and (5). Since all the parameters are known except $k_n r_w^2/h^2 k_p$, the difference between the measured and extrapolated pressures, $\Delta P(t)$, can be used to find the value of $r_w^2 k_n/h^2 k_p$ which satisifies the observations.

This quantity is, advantageously, evaluated by determining the difference, $\Delta P(t)$, between measured pressure response and the pressure given by equation (6) above at a particular time, $t_1$, after injection is stopped — for example, from a graph such as FIG. 2 — and then using a digital computer programmed to determine $(r_w^2 k_n/h^2 k_p)$ from equation (7) for the particular pressure difference, time of measurement, $t_1$, and values of the quantities $a/h$, $b/h$, $T_p(t_1-\Delta t)/948\, SR_w^2$ in question. The time, $t_1$, of course, must be a time prior to that time at which the rate of change of pressure with respect to the logarithm of the quantity $t/(t-\Delta t)$ becomes constant.

Once the value of $(r_w^2 k_n/h^2 k_p)$ is determined, $k_n$, may be determined as described above from known values of $r_w$ and $h$ together with the measured slope of the long time pressure response (which equals $70.6q/T_p$) using the definition of parallel transmissibility, $T_p$, given in equation (2). Additionally, once this quantity $(r_w^2 k_n/h^2 k_p)$ is determined the function G can be evaluated, for example from equation (3). Knowing G, equation (1) can be solved for skin factor, $s$. Therefore, this embodiment of the single point vertical permeability test provides a means for determining well bore damage about a bore hole partially opened into fluid communication with an anisotropic formation.

It should be understood that although the description of the present invention given above is primarily directed to the injection of fluid at a constant rate for a selected period of time followed by a shut in period in which pressure declines, the method may be practiced by producing fluid at a constant rate and then shutting in the well for a shut-in period in which pressure rises. The method of analysis of observed pressure response is the same in either case. Of course, changes in required well equipment from that shown in FIG. 1 may be required. These changes will be apparent to those skilled in the art. Should the injection or production rates not be substantially constant during the pertinent test period, the test data can still be interpreted by mathematical manipulation known to those skilled in the art.

I claim as my invention:

1. A method for determining the permeability normal to the plane of the formation of a fluid-containing subsurface earth formation of storage capacity, $S$, comprising the steps of:

traversing sid formation with a well bore of selected radius:

determining the thickness of said formation;

casing said bore hole with a tubular casing;

cementing said casing in place;

opening an interval of said bore hole adjacent said formation into fluid communication with said formation, said opened interval being shorter than said formation is thick;

determining the distance, $a$, from the top of said interval to the top of said formation and the distance, $b$, from the bottom of said interval to the bottom of said formation;

flowing a fluid of viscosity, $\mu$, between said bore hole and said formation through said opened interval of said bore hole at a substantially constant fluid flow rate under a fluid flow pressure;

measuring pressure response at said open interval while maintaining said fluid flow substantially constant for a selected period of time at least sufficiently long that the fluid flow pressure varies linearly with the logarithm of time;

stopping the flow of fluid between the well bore and the formation at the end of the selected period of time;

thereafter, measuring the fluid pressure in the well at least until the measured pressure response varies as a linear function of the logarithm of $t/t(t-\Delta t)$ where $t$ equals the total time elapsed since fluid flow between the well bore and the formation was initiated and $\Delta t$ equals the selected period of time for which fluid flow was continued;

determining the slope, $m$, of said linear function of the logarithm of $t/(t-\Delta t)$;

determining the difference, $\Delta p$ $(t_1)$, between said linear function of $t/(t-\Delta t)$ and measured fluid pressure in the well at a time, $t_1$, after fluid flow is stopped;

determining the value of the quantity $(r_w^2 k_n/h^2 K_p)$ from an equation of the form:

$$\Delta_p(t_1) = \frac{70.6q}{T_p}\left[+G\left(\frac{a}{h},\frac{b}{h},\frac{r_w^2 k_n}{h^2 k_p}\right) - F\left(\frac{a}{h},\frac{b}{h},\frac{r_w^2 k_n}{h^2 k_p},\frac{T_p(t_1-\Delta t)}{948 S r_w^2}\right)\right]$$

where $q$ = the substantially constant fluid flow rate;

$T_p$ = parallel transmissibility of the formation = $70.6q/m$;

$a$ = distance from the top of the perforated interval to the top of the formation;

$b$ = distance from the bottom of the perforated interval to the bottom of the formation;

$h$ = the thickness of the formation;

$r_w$ = selected radius of the well bore;

$k_n$ = permeability normal to the plane of the formation;

$k_p$ = permeability parallel to the plane of the formation = $T_p \mu/h$;

$S$ = storage capacity of the reservoir.

and calculating the normal permeability of said formation from the value of said quantity.

2. The method of claim 1 wherein the step of flowing a fluid between said bore hole and said formation comprises injecting a fluid into said formation at a fluid injection rate at a fluid injection pressure.

3. The method of claim 1 wherein the step of flowing a fluid between said bore hole and said formation comprises producing fluid from said formation at a fluid production rate at a fluid production pressure.

4. The method of claim 1 wherein the step of opening an interval of said borehole into fluid communication with said formation comprises perforating said casing through an interval of length less than one half the thickness of said formation.

5. The method of claim 1 wherein the step of determining the value of the quantity $(r_w^2 k_n/h^2 K_p)$ comprises the step of generating said quantities on a digital computer programmed to solve said equation for $\Delta p$ $(t_1)$.

* * * * *